United States Patent [19]

Park

[11] Patent Number: 5,650,765
[45] Date of Patent: Jul. 22, 1997

[54] AUTOMOTIVE REAR SAFETY DETECTION SYSTEM

[76] Inventor: Tae Soo Park, 5228 Cedar La. #139, Columbia, Md. 21044

[21] Appl. No.: 279,014

[22] Filed: Jul. 22, 1994

[51] Int. Cl.$^6$ ..................................................... G08G 1/00
[52] U.S. Cl. ........................ 340/436; 340/435; 340/903; 340/904; 367/909; 367/93; 180/169
[58] Field of Search ........................ 340/435, 436, 340/901, 903, 904; 367/112, 909, 93; 180/169

[56] References Cited

U.S. PATENT DOCUMENTS

| | | | |
|---|---|---|---|
| 4,260,980 | 4/1981 | Bates | 340/436 |
| 4,467,313 | 8/1984 | Yoshino | 340/904 |
| 4,543,577 | 9/1985 | Tachibana | 340/904 |
| 5,028,920 | 7/1991 | Dombrowski | 340/436 |
| 5,210,521 | 5/1993 | Hojell | 340/436 |
| 5,432,516 | 7/1995 | Cherry et al. | 340/436 |
| 5,453,740 | 9/1995 | Gallagher et al. | 340/436 |

*Primary Examiner*—Jeffery Hofsass
*Assistant Examiner*—Edward Lefkowitz
*Attorney, Agent, or Firm*—Eugene Oak

[57] ABSTRACT

An automotive rear detection system which assists a driver by informing whether an obstacle is present when the vehicle is in a reverse motion. The alarm is activated by transmitting an audible noise to warn the driver. The signals are monitored by detectors which uses frequency modulation current wave mode to recognize whether objects are present within approximately eight feet regardless if it is in motion or not. The detectors send a signal to a control box mounted inside the vehicle which activates the alarm.

1 Claim, 5 Drawing Sheets

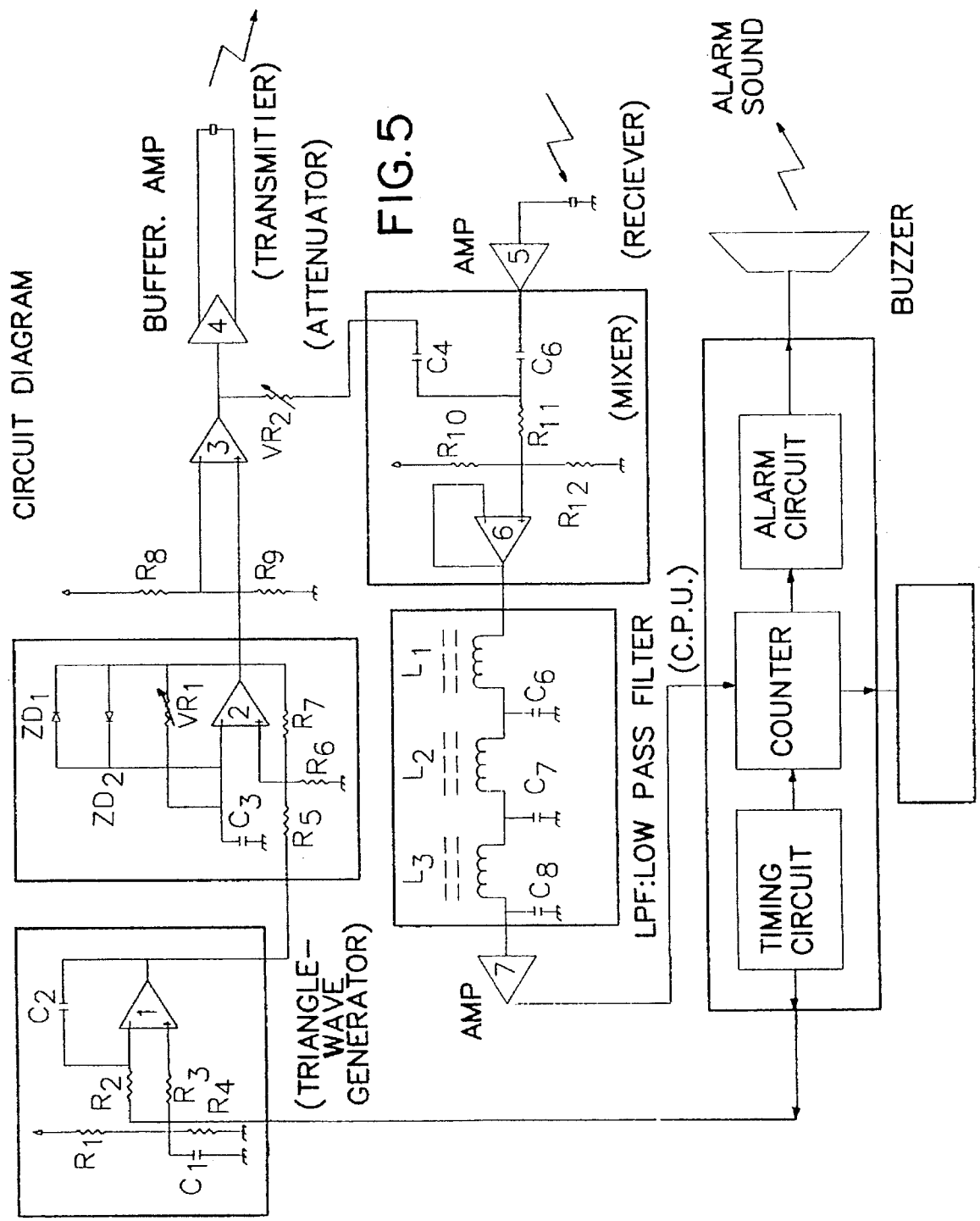

AUTOMOTIVE REAR SAFETY DETECTION SYSTEM

FIELD OF THE INVENTION

The present invention relates to an automotive rear safety checking system to aid the driver in detecting whether cars, buses, persons or objects are present when the vehicle is in a reverse motion.

BACKGROUND OF THE INVENTION

Standard automobiles have attached rear view mirrors to assist the driver in checking whether there are obstacles in the rearend of the automobile. However, this conventional apparatus is not sufficient due to its reliability on the accuracy of one's vision and neglects the fact that blind spots exist.

There are various detection systems which are able to enhance the ability of the driver to check whether obstacles are present. Such systems are disclosed in U.S. Pat. No. 4,543,577 to Tachibana, U.S. Pat No. 4,467,313 to Yoshino, and U.S. Pat. No. 5,210,521 to Hojell. These devices help detect moving objects, nearby persons, and the like.

Nevertheless, these devices have many shortcomings due to their dependency on "pulse transmission mode". The pulse is transmitted using mechanical vibration. The remaining or excess vibration can easily enter into a transmitting element and hence the effectiveness of a receptor significantly decreases. In addition, the pulse transmission mode's time is brief and its actual energy that is transmitted is very weak.

Furthermore, there is much ultrasonic distortion in the air such as collision of metals and wind turbulence which may produce strong ultrasound thus making it difficult to distinguish from intended vibrations. Conclusively, "pulse transmission mode" is difficult to operate and has minimal reliability.

Accordingly, there is still a present need for a detection system which is able to notify the driver of objects present whether in motion or not, at a reasonable distance by using "frequency modulation current wave mode".

SUMMARY OF THE INVENTION

The present invention has been developed in order to provide an automotive rear safety checking system comprising of two detectors attached on or near the rear bumper of the vehicle to inform the driver of obstacles approximately within eight feet. The detectors transmit a signal to a control box mounted inside the vehicle. The control box activates a speaker and sends an audible sound to warn the driver of possible impediments.

Putting the vehicle in reverse gear activates the system, a tone tells you that the system is working. The detectors scan as far as eight and one-half feet from the rear of the vehicle, enabling you to detect objects where rear-view mirrors can't. With the system being activated, virtually any object that comes within the WARNING ZONE causes the system to beep. Then, when the object is in the CRITICAL ZONE, the system issues a panic signal that warns of imminent contact. Having been warned of a possible collision situation, you should maneuver or stop to prevent damage or injury.

The present invention utilizes "frequency modulation current wave mode" which allows the receiving voltage to be easily distinguished from distorted waves because the receiving voltage of the present invention is much larger than any possible distorted waves.

Accordingly, it is a primary object of the present invention to provide a system for informing a vehicle driver of any rear obstacles whether in motion or not.

It is another object of the present invention to provide a system that can detect objects in a relative distance to the automobile.

It is another object of the present invention to provide a system which can distinguish ultra sound waves.

It is a further object of the present invention to provide a system which is simple and easy to install.

It is still a further object of the present invention to provide a system which provide an audible sound for detection.

It is still a further object of the present invention to provide a system where the sharpness of one's vision is not relied upon.

BRIEF DESCRIPTION OF THE DRAWINGS

The features and advantages of the present invention will become more apparent from the following description and drawings in which:

FIG. 5 shows a detailed circuit diagram.

DETAILED DESCRIPTION OF THE PREFERRED EMBODIMENT

The present invention will be described below with reference to the embodiments shown in the accompanying drawings.

Figure 1:
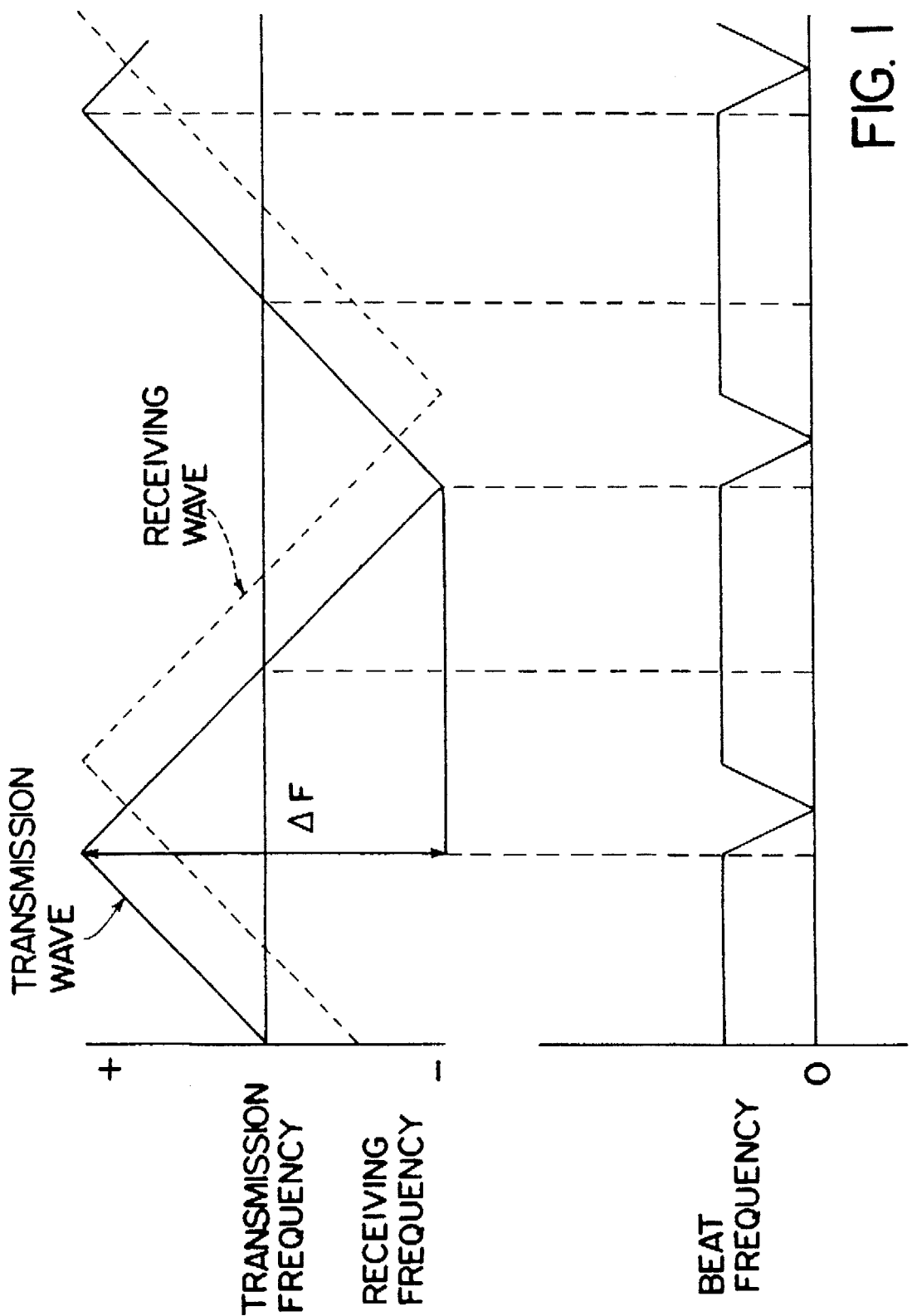
FIG. 1 shows a transmission wave at a particular frequency.

Referring now to FIG. 1, is a transmission wave at a certain frequency (usually 40 khz) that is measured hourly and in a constant set + or − direction is changed. The transmission wave is indicated upon contact with an object and is emitted to a receptor where it is combined with partial signals. The difference in frequency is imputed as a beat frequency when changed into transmission and reception frequencies (1 Hz–100 Hz).

The difference between transmission frequency (40 KHz) and beat frequency is so great that even with a simple "filter" these two signals could be easily isolated. The transmission frequency is aggressively delivered into the receiving circuitry and as a result, it cannot cause a malfunction in the circuitry.

In other words, the reflected transmission from a near object has less change in the beat frequency as oppose to the reflected transmission from a far object where more changes occur in the beat frequency because the oscillating frequency is considerably different from the point of transmission.

Figure 2:
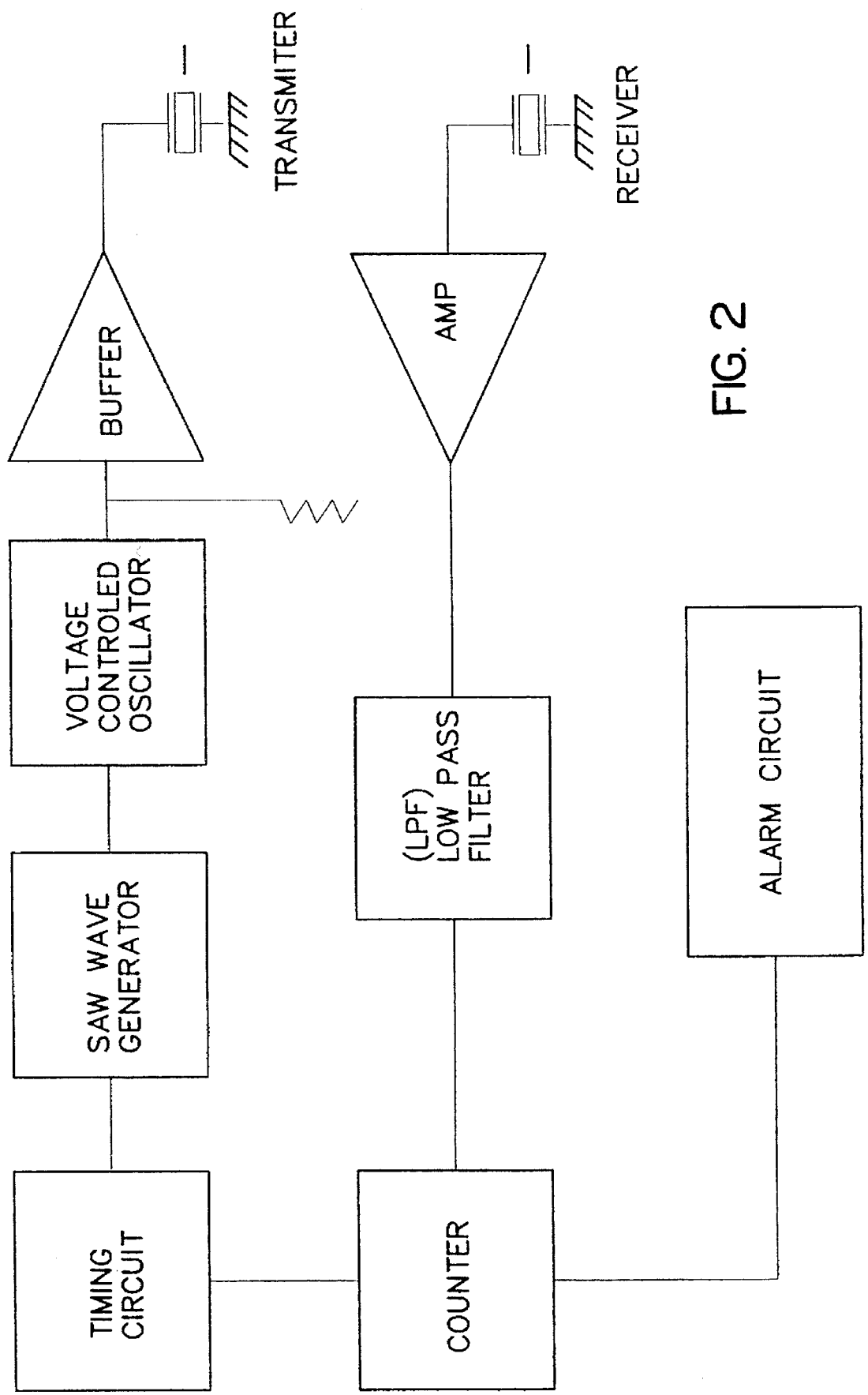
FIG. 2 is a block diagram of the electric current flow.

Now referring to FIG. 2, the initial wave is generated by the Timing Circuit. This starting output is then transferred to the Saw Wave Generator and also the Counter. The Saw Wave Generator produces the central wave and the oscillator gradually changes the central wave to a certain frequency as the direction of the Saw Wave changes. (The frequency can become higher (+) or lower (−) comparable to switching a radio station.)

Furthermore, the oscillating wave accumulates an efficient amount of strong voltage in Buffer Amp and the oscillating wave is emitted by a radiator into a space. The reflecting waves in the receiver directly enter the receiver by combining their transmission powers.

Since the waves described above are high frequencies, Low Pass Filter (LPF) is eliminated. The counter calculates how many beats occur within each saw wave period and estimates the distance to which the messages are sent to the alarm circuit.

The alarm circuit detects the numbers of beat and if the number is too high, then the object is still at a distant. However, if there are a few beats, then the alarm will send an escalating sound informing the driver that an obstacle is extremely close to the rear of the automobile. Similarly, if no beats exists, then no action is detected by the alarm.

Figure 3:
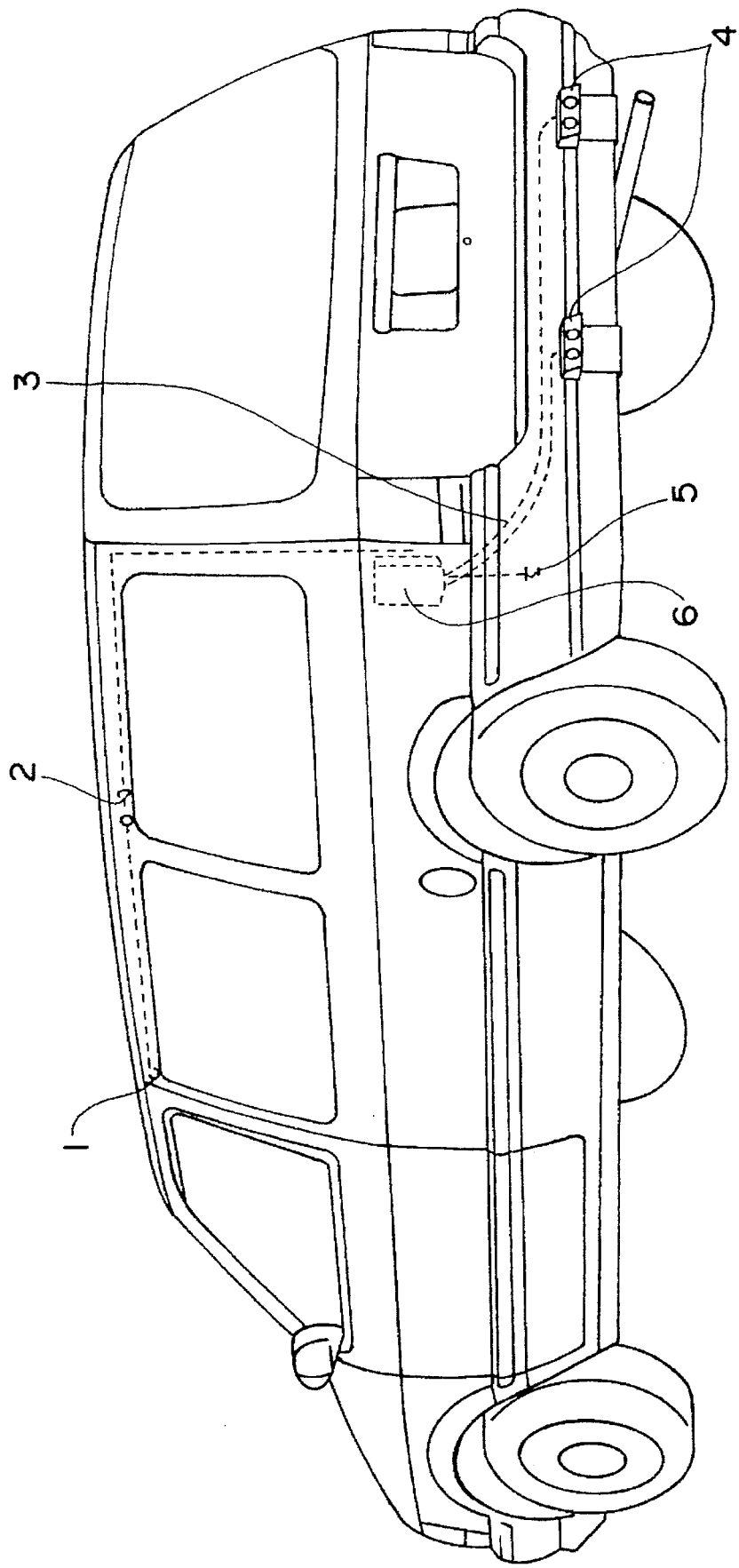
FIG. 3 is a perspective view of where the component parts of the system will be installed in and on the automobile.

FIG. 3 shows a perspective view of where parts of the system will be installed in the vehicle. Two detectors 4 mounted on or near the rear bumper detect objects that come within approximately eight feet. The detectors 4 send a signal to a control box 6 mounted inside the vehicle. The control box 6 activates a speaker mounted near the driver. The speaker may be under the dash, on the door pillar, or in another convenient spot. The detectors 4 in the rear broadcast a field of harmless ultrasonic waves.

The waves will not interfere with radios, televisions, or other electronic equipment. The alarm 1 is positioned near the front of the vehicle by the driver. The R.C.A. jack 2 is located near the top of the vehicle. The back-up light (red wire) 3 and ground (black wire) 5 are situated along the rear bumper near the detectors 4.

Figure 4:
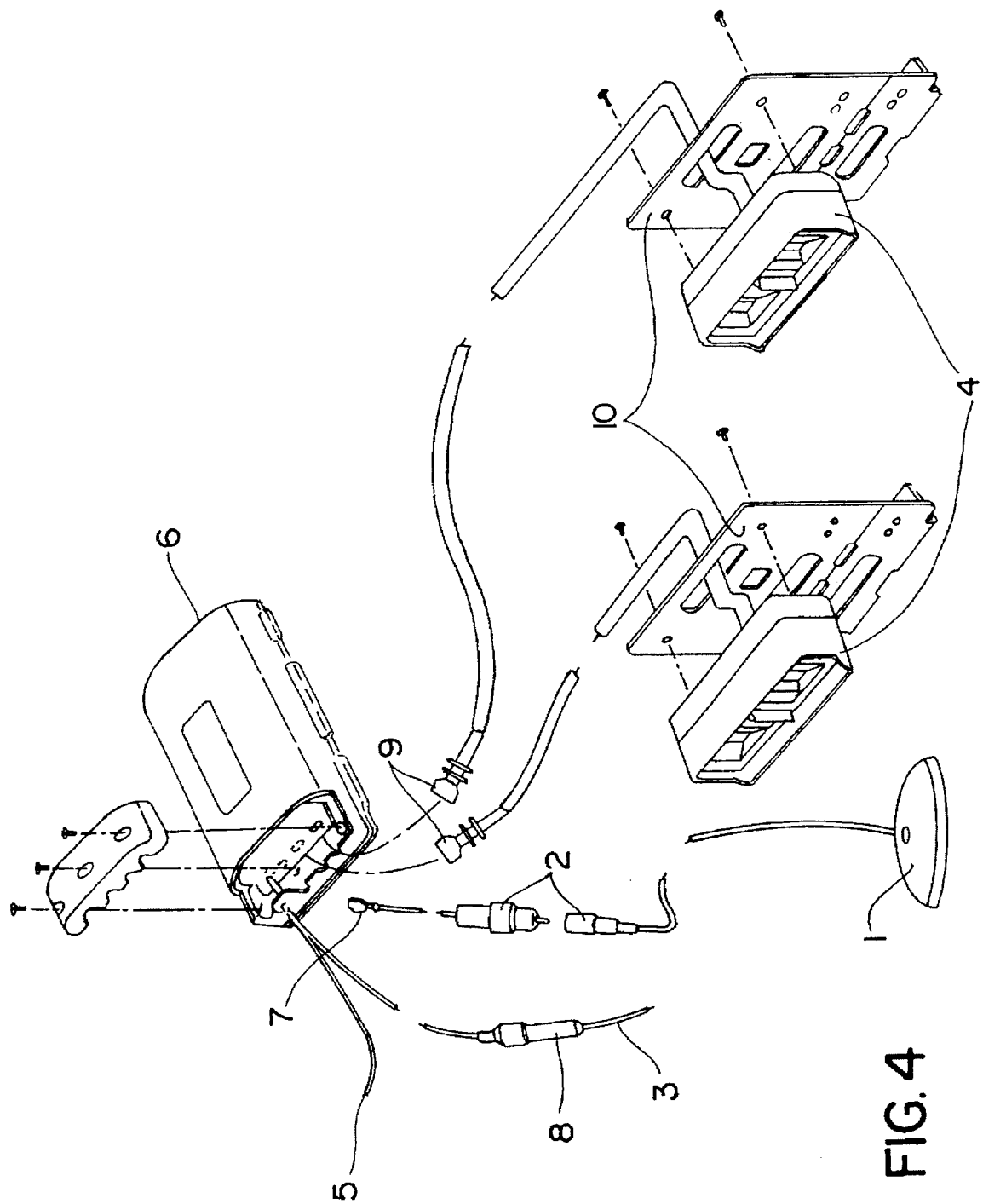
FIG. 4 is perspective view of each individual component of the system.

FIG. 4, shows the various components which constitute the system. The alarm 1 and control box 6 are installed. The black wire 5 is connected from the control box 6 to ground (−). The red wire 3 is connected to the positive (+) wire of the back-up light. The 4-pin connectors 9 are attached from the detectors 4 to the control box 6. The route speaker cable and speaker lead cable using wire ties if required; connect speaker cable, speaker lead cable and 2 pin connector 7 to the control box 6. Test and adjust detectors 4 for maximum coverage.

Now referring to FIG. 5, the circuit functions based on a standard time pulse is made from a central processing unit (CPU). The triangle-wave generator is a typical integral circuitry that creates triangle waves. (triangle-waves are related to standard time pulse.) R1 and R4 determines the central level of the triangle waves. R2 and C2 determines the movement of the triangle waves.

40 Khz oscillating generator sets VR1 and C3 to continuously emit 40 Khz. However, since triangle waves come through R5, there are small variations in frequency that are centered around 40 Khz. At this point, ZD1 and ZD2 make constant oscillating voltage that limit changes in central frequency.

The oscillating current which has changed frequency (output of energy) grows from IC3 to a source of electricity voltage. The Buffer Amp becomes a bipolar current that strongly vibrates the receiver which emits ultrasound in return. The ultrasonic emitted reflects an object and returns to the transmitter. The signal becomes amplified at IC5 (AMP) and transfers to the Mixer.

VR2 and C4 lessen parts of the reduced transmitter current. This reduced portion of the transmitter current in the mixer and the amplified receiving signals become blended. This blended element gets amplified again at IC6 and is consequently sent to the low pass filter (LPF).

When the transmitting signals are emitted, the rate of the oscillating frequencies change constantly. Thus, there is a steady difference between transmitting frequency and receiving frequency that is prior to the entrance of receiving signals. These frequency differences are combined analogously and sent as beat frequencies. The frequencies are released as output of energy.

The low pass filter blocks most of the transmitting signals that are (approximately stationed at 40 Khz). However, the low pass filter sends beat frequency which is the difference between transmitting and receiving signals.

Beat frequencies get amplified again in IC7 and then are sent to CPU. CPU is an integrated circuit (IC) and its main function is to measure how many beats are created. This measurement is examined by counting each standard time pulse period.

The beat frequency that is produced from the mixer of an object far away has a larger difference in transmitting and receiving frequencies. Likewise, the beat frequency that is produced from the mixer of an object close by has a smaller difference in transmitting and receiving frequencies. This data is sent to a distance marker and registered. For various distance, there will be corresponding alarm sounds which will help the driver to perceive the distance accurately. This alarm sound is helpful since it alerts the driver to check the surrounding areas.

I claim:

1. A safety detection system for attachment to an automobile, said safety detection system comprising:

a constant frequency ultrasonic isosceles wave generating generator connected to be energized from the automobile;

first and second outputs from said constant frequency isosceles wave generating generator;

an ultrasonic radiator for mounting on the automobile and connected to said first output for generating ultrasonic acoustic waves adjacent the automobile so that obstructions adjacent the automobile reflect ultrasonic waves back toward the automobile;

an ultrasonic receiver for mounting on the automobile, said ultrasonic receiver receiving ultrasonic waves and converting them to corresponding electrical signals;

means for subtracting said second output from said constant frequency isosceles wave ultrasonic wave generator from the received signal to produce a resultant isosceles triangle wave train which has a frequency corresponding to the difference in frequency between the transmitted ultrasonic signal and the received ultrasonic signal, a low pass filter, said wave train being connected through said low pass filter to filter out substantially all ultrasonic signal so that the resultant wave train has a frequency and amplitude which is a direct function of the difference between the frequency of the radiated signal and the frequency of the received signal; and a counter for counting the frequency of the wave train from said low pass filter and an alarm connected to said counter so that when said counter detects a frequency of said wave train above a reference frequency, said alarm is energized.

* * * * *